W. R. MACDONALD.
ELECTRIC MOTOR AND PUMP.
APPLICATION FILED JAN. 15, 1912.

1,066,635.

Patented July 8, 1913.
2 SHEETS—SHEET 1.

WITNESSES
F. B. Townsend
M. A. Porter

INVENTOR
WILLIAM RICHARD MACDONALD
BY
Townsend & Decker
ATTORNEYS

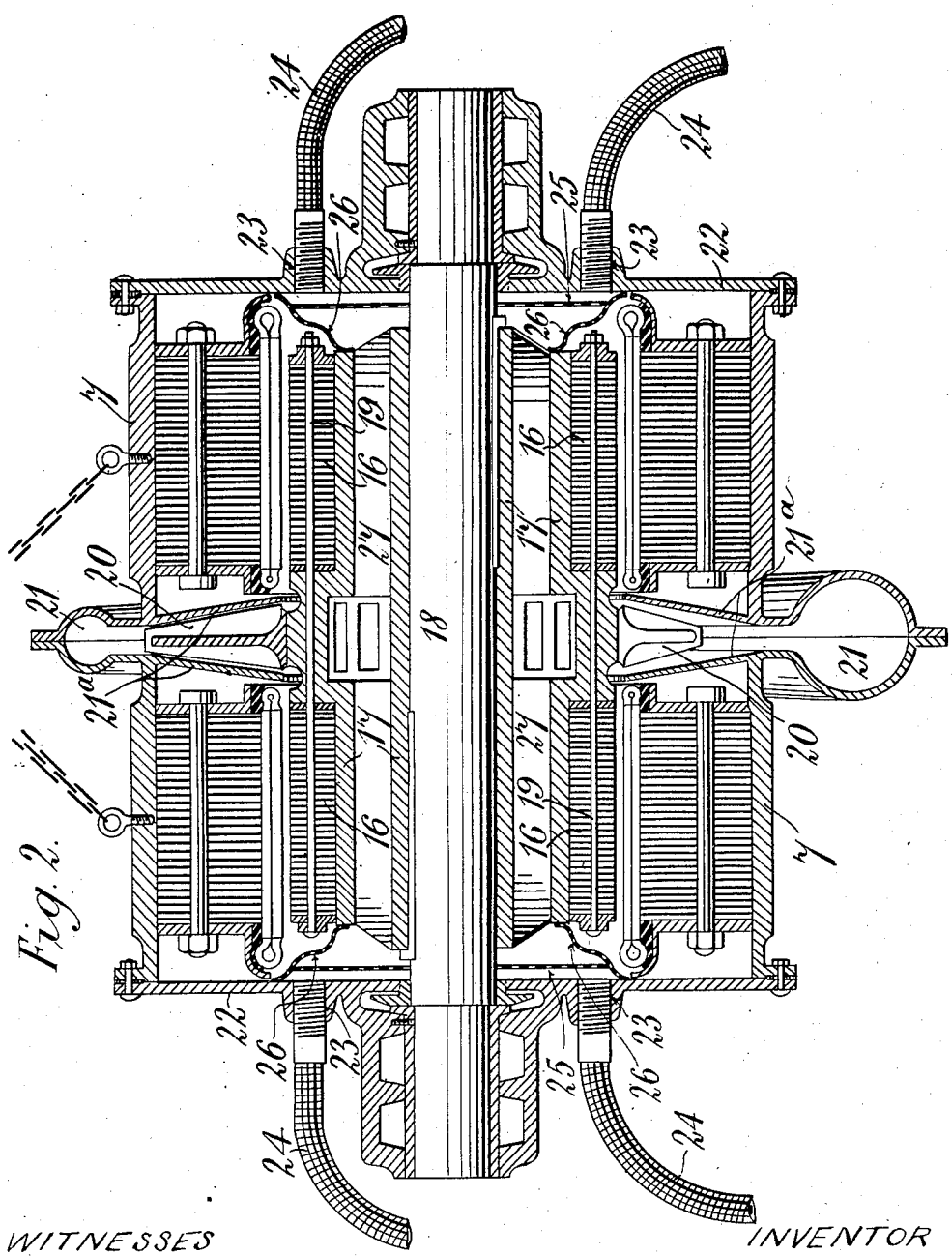

UNITED STATES PATENT OFFICE.

WILLIAM RICHARD MACDONALD, OF PORTLAND PLACE, LONDON, ENGLAND.

ELECTRIC MOTOR AND PUMP.

1,066,635.  Specification of Letters Patent.  Patented July 8, 1913.

Application filed January 15, 1912. Serial No. 671,257.

*To all whom it may concern:*

Be it known that I, WILLIAM RICHARD MACDONALD, a subject of the King of Great Britain and Ireland, residing at Portland Place, in the county of London, England, have invented Improvements in and Relating to Electric Motors and Pumps, of which the following is a specification.

This invention relates to combined electric motors and pumps, adapted to be used under water if so desired, and it has for its object to provide improved arrangements and combinations of parts as hereinafter more particularly described tending to greater simplification of construction and compactness.

Figure 1:
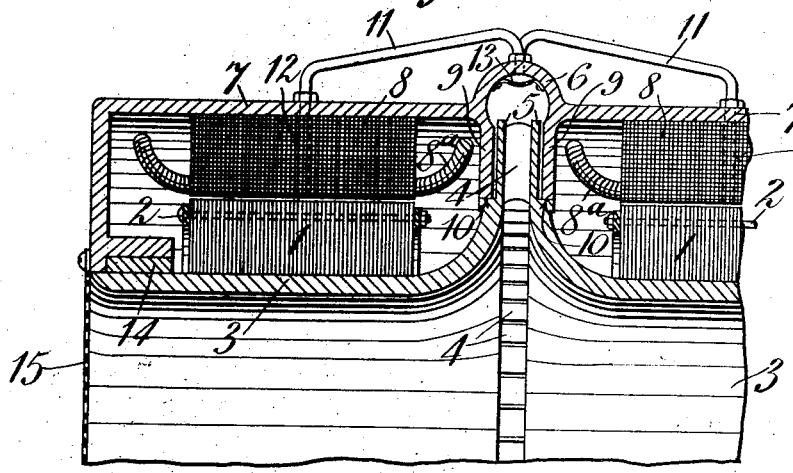

In the accompanying drawings Figure 1 is a longitudinal section of part of one form of a combined motor and pump according to the invention. Fig. 2 is a longitudinal section and Fig. 3 an end elevation of another form.

Figure 3:
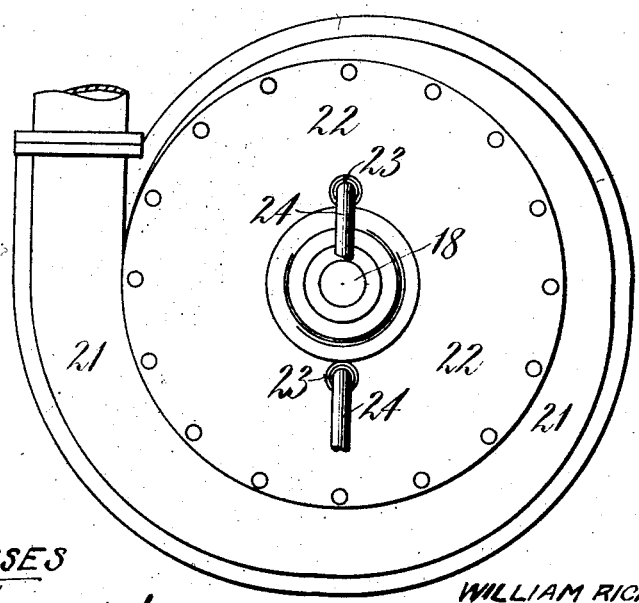

As shown in Fig. 1, two armature cores 1 provided with conductors 2, and together constituting a divided squirrel cage rotor, are mounted in separated relationship upon a hollow shaft 3 of large diameter. This shaft forms part of the pump, being fashioned intermediate of its length as a centrifugal impeller that is to say with blades 4 disposed between disk like portions 5. The pump is completed by a delivery chamber which may conveniently be formed by expanding at 6 the casing 7 for two stator or field core parts 8 associated with the rotor parts 1. 8ª are the stator windings. To prevent passage of liquid from the pump laterally outward into the motor the delivery chamber may be formed or provided with partition walls 9 making joint with shoulders 10 upon the impeller. To permit liquid to flow into the motor for cooling purposes, by-passes 11 may be provided leading from the delivery chamber to channels 12 in the stator parts 8 means such as gauze at 13 being provided if necessary to prevent solid matter following the same path. 14 are bearings for the combined motor rotor and impeller. If desired gauze may be provided, as shown at 15, to prevent ingress of solid matter to the pump. Although in this ex- ample each rotor part 1 is shown as provided with separate conductors 2, it will be understood that one set of conductors might be employed common to both and extending through the impeller and it is such an arrangement that is illustrated in Figs. 2 and 3. In this case two armature core parts 16 are carried by a spider 17 that is secured upon a solid shaft 18, the liquid being supplied to the impeller through the said spider. The conductors 19 extend across the gap between the two core parts 16 as shown. The impeller blades 20 secured to the spider are of truncated triangular shape and the walls 21ª extending from the delivery chamber 21 are inclined to correspond. The motor casing 7 is closed at its ends by plates 22, openings at 23 therein serving to admit liquid to the spider. If the combined pump and motor is immersed these inlet openings will be sufficient but if the pump is intended to draw liquid from a depth, pipes, such as shown at 24, will be required. As before, means such as gauze will be provided as and where required to prevent ingress of solids, a sheet of gauze being shown at 25 at each end of the casing, as protecting all inlets to the pump, while gauze at 26, making a close but rubbing joint with the spider 17 may serve to prevent solid matter gaining access to the motor without however preventing it passing through the pump. The arms 27 of the spider 17, constituting between them the liquid conveying passages, may be formed in such a manner as to draw in liquid from the ends, the shade lines in Fig. 2 representing the extremities as being curved for this purpose.

What I claim is:—

1. In combination, an electric motor comprising longitudinally separated stator and rotor parts, a centrifugal pump intermediate of said parts, and a casing, forming part of the pump, inclosing all the motor parts, substantially as described.

2. In combination, an electric motor rotor, a pump impeller intermediate of the length of said rotor, a motor stator divided into two axially separated portions, a delivery chamber between such portions coöperating with the impeller aforesaid and a casing, forming part of the delivery chamber, inclosing the motor rotor and stator parts.

3. In combination, a rotor adapted to permit liquid to enter it from both ends, centrifugal impeller blades in communication with the rotor intermediate of its length, armature core parts disposed at opposite sides of the impeller blades, a casing surrounding the rotor and formed with a delivery chamber coöperating with the impeller blades, and motor stator portions within said casing, at opposite sides of the delivery chamber associated with the armature core parts.

4. In combination, a rotor having longitudinally arranged passages open at their ends to permit entry of liquid, lateral openings intermediate the length of the rotor constituting liquid outlets, impeller blades in communication with such outlets, a casing surrounding the rotor and having a delivery chamber, companion to the impeller blades, side walls extending from the delivery chamber and along the sides of said blades, an armature core portion at each side of the impeller secured upon the rotor and companion stator portions mounted at each side of the delivery chamber, within said casing.

5. In combination, a rotor adapted to permit liquid to enter it from both ends, longitudinally separated armature parts thereon, a pump impeller intermediate of said armature parts, a combined motor and pump stator associated with the said rotor, armature parts and impeller, and end plates for such casing having inlet openings adapted to permit entry of liquid to the hollow rotor.

6. In combination, a rotor adapted to permit liquid to enter it from both ends, longitudinally separated armature parts thereon, a pump impeller intermediate of said armature parts, a combined motor and pump stator associated with the said rotor, armature parts and impeller, end plates for such casing having inlet openings adapted to permit entry of liquid to the hollow rotor, and means forming a joint between the rotor and end plates adapted to prevent solid matter gaining access to the motor stator and armature parts.

7. In combination, an electric motor comprising longitudinally separated stator and rotor parts, a casing inclosing all such parts, and a centrifugal pump intermediate of said parts, the said pump having its interior in communication with the interior of the casing; for the purpose described.

8. In combination, a centrifugal pump, electric motor elements at opposite sides of the said pump, a casing extending from the pump to inclose the motor elements, end plates for said casing, and pipe connections for conducting liquid through the end plates to the interior of the casing.

9. In combination, a centrifugal pump, electric motor elements at opposite sides of the said pump, a casing extending from the pump to inclose the motor elements, end plates for said casing, pipe connections for conducting liquid through the end plates to the interior of the casing and filtering means protecting the outlet ends of the said pipe connections, for the purpose described.

10. In a combined electric motor and pump, a rotor, an impeller intermediate the length of the rotor, armature core parts disposed at each side of the impeller upon the rotor and conductors common to both armature parts, extending across the gap between said core parts.

11. In a combined electric motor and pump, a rotor having longitudinal liquid conveying passages constituted by arms therein, formed with curved liquid collecting extremities, an impeller intermediate of the rotor in communication with such passages and motor armature parts disposed at opposite sides of said impeller.

Signed at 49 Queen Victoria street, London, E. C. this twentieth day of December 1911.

WILLIAM RICHARD MACDONALD.

Witnesses:
VALERIC WILLEY,
C. HICKMAN.